3,510,332
PROCESS FOR THE PRODUCTION OF ZIRCONIUM-PRASEODYMIUM YELLOW PIGMENTS
Horst Weber, Leverkusen, Germany, assignor to Farbenfabriken Bayer Aktiengesellschaft, Leverkusen, Germany, a corporation of Germany
No Drawing. Filed Mar. 7, 1967, Ser. No. 621,123
Claims priority, application Germany, Mar. 16, 1966, F 48,668
Int. Cl. C09c 1/00
U.S. Cl. 106—299          5 Claims

ABSTRACT OF THE DISCLOSURE

Process for the production of zirconium-praseodymium yellow pigments from zirconium silicates without separating of sodium silicate, wherein in the first step the zirconium-silicate is decomposed by heating an alkali-zirconium silicate mixture to temperatures of 800–1200° C. or from 800–1100° C., in the second step an aqueous slurry of the decomposed product is formed by mixing the decomposed product with water in a molar ratio of water to zirconium silicate of from about 5:1 to 20:1, and with a praseodymium compound in an amount, sufficient to form said yellow pigments, in a third step a mineral acid is added to said aqueous slurry in an amount, sufficient to neutralize at least 0.5 alkali equivalents, thereby solidifying said aqueous slurry and in a fourth step said solidified mixture is calcined at a temperature of from 850 to 1300° C.

---

This invention relates to a process for the production of zirconium-praseodymium yellow pigments from zirconium silicates. Zirconium-praseodymium yellow pigments are used in the ceramics industry as highly stable pigments with an attractive yellow color.

U.S. patent specification Nos. 2,992,123 and 3,012,898 both relate to a process for the production of zirconium silicate yellow pigments in which mixtures of zirconium dioxide with silicon dioxide, praseodymium oxide and, optionally, mineralizers are calcined at temperatures in the range from 800 to 1100° C., and from 1100° C. to 1500° C. Pigments such as these usually contain from 35% to 80% of $ZrO_2$, from 10% to 55% of $SiO_2$ and from 0.5% to 10% of $Pr_6O_{11}$. Unfortunately, attempts to use zirconium dioxide directly instead of preparing it in a separate operation from the zirconium mineral $ZrSiO_4$ have failed.

It is an object of the present invention to provide a process for the production of zirconium-praseodymium yellow pigments with high tinting strength and thermal stability. It is another object of the present invention to provide a process for the production of said pigments from zirconium silicates which is highly economic.

It is still another object of the present invention to provide a process for the production of said pigments without separation of the sodium silicate thereby avoiding filtering and washing steps. Further objects are described in the foregoing and following parts of the description.

We have now developed a process for the production of zirconium-praseodymium yellow pigments by calcining mixtures containing zirconium, silicon and praseodymium oxides, optionally in the presence of mineralizers, which comprises converting zirconium silicate by means of alkali into a nonrefractory form, with a molar ratio of alkali metal to zirconium silicate greater than 1, by heating to a temperature above 800° C., mixing the converted product with water in a molar ratio of water to zirconium silicate greater than 5:1, with praseodymium oxide or a precursor therefore in a ratio by weight of praseodymium oxide to zirconium silicate of from 0.1% to 10% and with an inorganic acid, preferably sulfuric acid, in a proportion of more than 0.5 gram equivalent of acid per gram-atom of alkali, optionally in the presence of an alkali metal chloride as a mineralizer, calcining the resulting mixture after it has been dehydrated at a temperature in the range of from approximately 850° C. to 1300° C., and optionally grinding, washing and drying the calcine in the usual way.

It is surprisingly possible by virtue of the process according to the invention simply and, if desired, continuously to produce a zirconium-praseodymium yellow pigment of high tinting strength, pure hue and high thermal and chemical stability, even from naturally occurring zirconium silicate. In particular, excellent products are obtained as follows:

The zirconium silicate is heat-treated even in granular form—the grain size of the starting product does not have to meet any particular requirements—at a temperature in the range of from 800° C. to 1200° C., or from 800° C. to 1100° C., preferably in the range of from 950° C. to 1100° C., in the presence of an alkali. Although sodium carbonate is preferably used as the alkali, sodium hydroxide, potassium hydroxide, sodium hydrogen carbonate, potassium carbonate, lithium carbonate, and so on may also be used. More than one gram-atom of alkali, preferably from 1 to 4 gram atoms of alkali, and, with particular advantage, from 1.5 to 3 gram-atoms of alkali, are used per mol of $ZrSiO_4$. There is no advantage in using a high excess of alkali if the material to be decomposed is to be prevented from caking or from being sintered. Under the conditions specified, a powdery intermediate product is obtained whose further processing does not involve any difficulties. Periods varying from 15 minutes to two hours are usually required for decomposition although the time conditions are governed both by the conditions under which the process is carried out and by the quantities of material used.

The decomposed product is suspendend by introduction into water, for which purpose more than 5 mols of water are used per mol of zirconium silicate. It is preferred to use a molar ratio of zirconium silicate to water of from 1:5 to 1:20. Although there is no harm in using a large excess of water, it is technically inappropriate to do so because the water has to be removed again during the process. In general, the water should be used in a quantity just sufficient to produce a free-flowing or pumpable suspension.

A mineral acid is then added to the suspension. Suitable mineral acids are those normally used in industry, such as hydrochloric acid, phosphoric acid, sulfuric acid, or nitric acid, although particularly outstanding results are obtained with sulfuric acid. At least 0.5 acid equivalents e.g. 0.5–1.5 acid equivalents, and preferably 0.8 to 1.5 acid equivalents, should be added, based on the alkali present.

When the acid is added, the initially free-flowing mixture becomes progressively stiffer until it solidifies completely. In order to obtain optimum qualities, the acid must be homogeneously intermixed. It has proved to be of advantage to intermix the acid in an extremely small mixing vessel into which the compounds are continuously or periodically fed in the appropriate quantities and which enables them to be mixed together under high turbulence in the shortest possible time, preferably in a time of less than five minutes and more preferably in seconds.

The praseodymium compounds are added during preparation of the suspension, or either before or after the addition of the acid. Praseodymium oxide is preferably used although it is also possible to use praseodymium compounds which form oxides under the conditions of the process, such as, for example, praseodymium oxalate, praseodymium chloride, praseodymium nitrate, praseodymium sulfate, praseodymium fluoride, praseodymium carbonate, and mixtures thereof.

Following removal of the water, preferably by pre-drying, the resulting mixture is calcined at temperatures in the range of from 850° C. to 1250° C. Calcination may be carried out in the units normally used for the production of ceramic pigments, for example, chamber furnaces, tunnel furnaces, muffle furnaces or rotary furnaces. The mixture can be pre-dried on shelf-dryers, in tunnel dryers, rotary dryers, drum dryers or the like, and, if desired, even in the apparatus used for calcination. During calcination, the initially dried product should be kept for a period of at least approximately 30 minutes at a temperature in the range of from 850° C. to approximately 1250° C. in order to obtain a pigment with the requisite properties. The atmosphere under which calcination is carried out does not have to satisfy any particular requirements, with the result that there is no need to screen the product to be calcined from air.

Optimum tinting strengths are obtained at a calcination temperature of approximately 1050° C. to 1200° C. It is possible by adding fluorides such as alkali metal fluorides, e.g. sodium fluoride and potassium fluoride, alkali metal chlorides or zirconium oxyfluoride, and mixtures thereof, and so on, to lower the optimum temperature range for calcination by about 50° C. to 100° C. It is, however, not absolutely necessary to add mineralizers.

The calcined product is ground in the usual way and freed of salts.

The process according to the invention is illustrated by the following examples:

EXAMPLE 1

183 g. of zirconium silicate ($ZrSiO_4$) are mixed with 186 g. of sodium carbonate ($Na_2CO_3$), corresponding to a proportion of 3.5 gram atoms of Na per mol of $ZrSiO_4$, and the resulting mixture is placed in an open ceramic capsule and calcined for one hour at 1050° C. in an electrically heated furnace.

The calcine is mixed in a glass beaker with 210 ml. of water, 9 g. of praseodymium oxide ($Pr_6O_{11}$) and 9 g. of sodium fluoride, 222 g. of 96% sulfuric acid being added with stirring to the resulting mixture. The mass which is initially free-flowing, solidifying some 10 minutes after the sulfuric acid has been added, is dried, placed in an open capsule, calcined for two hours at 1100° C. in an electrically heated furnace, wet-ground, washed and dried. The product has a vivid yellow color both in powder form and after it has been embedded in a ceramic or enamel glaze.

EXAMPLE 2

183 kg. of zirconium silicate ($ZrSiO_4$) are mixed with 106 kg. of sodium carbonate (corresponding to a ratio of 2 gram atoms of alkali per mol of $ZrSiO_4$) in an immersion mixer, and the resulting mixture is calcined for one-half hour at 1000° C. in a gas-fired rotary furnace. The calcine which accumulates in loose form is mixed in an agitation vessel with 250 litres of water, 9 kg. of praseodymium oxide ($Pr_6O_{11}$) and 9 kg. of sodium fluoride (NaF). The resulting mixture and 127 kg. of 96% sulfuric acid are continuously run into a narrowly encased intensive stirrer through a metering pump which delivers the mixture at a rate of 2 t. per hour and an inlet adjusted to 270 liters of 96% sulfuric acid per hour. The residence time of the mass in the intensive stirrer is about 1 second. The mixture, which solidifies in about two minutes, is delivered into a rotary furnace in which it is dried and then heated for three hours to 1,100° C. The oven is emptied, the calcine is introduced into a ball mill together with approximately 200 litres of water and the soluble salts are removed by washing. Finally, the pigments which accumulates in a quantity of about 185 kg. is dried. The product has a vivid yellow color both in powder form and after it has been embedded in a ceramic or enamel mass.

I claim:
1. Process for the production of zirconium-praseodymium yellow pigments, comprising decomposing zirconium silicate by heating a zirconium silicate-alakli mixture to a temperature of from about 800 to 1200° C., said mixtures having an alkali metal-zirconium silicate molar ratio of between about 1:1 and 4:1, forming an aqueous slurry by adding to the decomposed product thereby formed water in a molar ratio of water to zirconium silicate of from about 5:1 to 20:1 and a praseodymium compound in a ratio by weight of praseodymium oxide to zirconium silicate of from about 0.1 to 10.0%, adding to said aqueous slurry a mineral acid in an amount of 0.5:1.5 acid equivalents based on the alkali present, and forming said zirconium-praseodymium yellow pigment by calcining the resultant mixture to a temperature of from about 850 to 1300° C.

2. Process according to claim 1 wherein the calcination is performed in the presence of a mineralizer selected from the group consisting of alkali metal fluorides, alkali metal chlorides, zirconium oxyfluoride and mixtures thereof.

3. Process according to claim 1 wherein the praseodymium compound is selected from the group consisting of praseodymium oxide, praseodymium oxalate, praseodymium chloride, praseodymium nitrate, praseodymium sulfate, praseodymium fluoride, praseodymium carbonate and mixtures thereof.

4. Process according to claim 1 wherein the mineral acid is sulfuric acid.

5. Process according to claim 1 wherein 0.8 to 1.5 acid equivalents based on the alkali present are mixed with the aqueous slurry.

References Cited

UNITED STATES PATENTS

| | | | |
|---|---|---|---|
| 1,618,288 | 2/1927 | Kinzie | 106—299 |
| 2,871,138 | 1/1959 | Linnell | 106—299 |
| 2,889,232 | 6/1959 | Linnell | 106—299 |
| 2,992,123 | 7/1961 | Seabright. | |
| 3,012,898 | 12/1961 | Seabright. | |
| 3,168,410 | 2/1965 | Bouneau | 106—299 |
| 3,389,005 | 6/1968 | Kloepfer et al. | 106—299 |

FOREIGN PATENTS

| | | |
|---|---|---|
| 1,417,516 | 10/1965 | France. |
| 1,209,932 | 1/1966 | Germany. |

OTHER REFERENCES

Chemical Abstracts, vol. 63, p. 11147e (1965).

TOBIAS E. LEVOW, Primary Examiner

H. M. S. SNEED, Assistant Examiner